US008494709B2

(12) United States Patent
Hamada et al.

(10) Patent No.: US 8,494,709 B2
(45) Date of Patent: Jul. 23, 2013

(54) ON-VEHICLE COMMUNICATION DEVICE

(75) Inventors: Yuji Hamada, Tokyo (JP); Yoshitsugu Sawa, Tokyo (JP); Yukio Goto, Tokyo (JP); Shigeki Morita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 174 days.

(21) Appl. No.: 12/812,895

(22) PCT Filed: Nov. 26, 2008

(86) PCT No.: PCT/JP2008/071449

§ 371 (c)(1), (2), (4) Date: Jul. 14, 2010

(87) PCT Pub. No.: WO2009/107297

PCT Pub. Date: Sep. 3, 2009

(65) Prior Publication Data

US 2010/0312432 A1 Dec. 9, 2010

(30) Foreign Application Priority Data

Feb. 25, 2008 (JP) ................................ 2008-042566

(51) Int. Cl.
*G06F 7/00* (2006.01)

(52) U.S. Cl.
USPC ........................... 701/31.4; 340/435; 340/436

(58) Field of Classification Search
USPC ..................... 701/29.1, 31.4; 340/425.5–490, 340/901–905, 988–996
See application file for complete search history.

(56) References Cited

U.S. PATENT DOCUMENTS 6,005,853 A * 12/1999 Wang et al. ................... 370/332
6,519,462 B1 * 2/2003 Lu et al. ........................ 455/453
7,257,405 B2 * 8/2007 Yamato et al. ................ 455/445
7,499,675 B2 * 3/2009 Tsuzuki et al. ................. 455/73
2008/0037577 A1 2/2008 Nagura
2010/0049819 A1 2/2010 Hamada et al.
2010/0106364 A1 * 4/2010 Sagisaka ........................ 701/36

FOREIGN PATENT DOCUMENTS

CN 1947162 A 4/2007
JP 2005 039665 2/2005
JP 2006 025028 1/2006

(Continued)

OTHER PUBLICATIONS

Chinese Office Action mailed on Aug. 3, 2012, issued for Chinese Application No. 200880125582.9, filed on Nov. 26, 2008 (with Partial English Translation).

*Primary Examiner* — Thomas Tarcza
*Assistant Examiner* — Tyler J Lee
(74) *Attorney, Agent, or Firm* — Oblon, Spivak, McClelland, Maier & Neustadt, L.L.P.

(57) ABSTRACT

An on-vehicle communication device capable of suppressing a delay in providing information, avoiding congestion, and sufficiently securing transmission power, includes a communication controller to controls a transmission cycle and transmission power when data is transmitted from a transmitting/receiving device. The communication controller uses its own vehicle information and surrounding vehicle information to estimate a degree of risk and a safe distance of its own vehicle. The communication controller controls the transmission cycle of its own vehicle based on a communication channel utilization rate of its own vehicle, a communication channel utilization rate of a surrounding vehicle and the degree of risk of its own vehicle, and controls the transmission power of its own vehicle based on the communication channel utilization rate of its own vehicle, the communication channel utilization rate of the surrounding vehicle and the safe distance.

10 Claims, 11 Drawing Sheets

FOREIGN PATENT DOCUMENTS

| | | |
|---|---|---|
| JP | 2006 209333 | 8/2006 |
| JP | 2007 06092 | 1/2007 |
| JP | 2007 006395 | 1/2007 |
| JP | 2008 042738 | 2/2008 |

* cited by examiner

F I G . 7

| PARAMETER NAME | VALUE |
|---|---|
| TRANSMITTING ANTENNA GAIN | 0 [ dBi ] |
| TRANSMITTING ANTENNA CABLE LOSS | 4 [ dB ] |
| RECEIVING ANTENNA GAIN | 0 [ dBi ] |
| RECEIVING ANTENNA CABLE LOSS | 4 [ dB ] |
| RECEPTION SENSITIVITY | -85 [ dBm ] |
| ERROR CORRECTION GAIN | 11 [ dB ] |
| FADING MARGIN | 10 [ dB ] |
| TRANSMISSION FREQUENCY | 5.8 [ GHz ] |

ON-VEHICLE COMMUNICATION DEVICE

TECHNICAL FIELD

The present invention relates to an on-vehicle communication device mounted on a vehicle for enabling inter-vehicle wireless communication, and more particularly, to an on-vehicle communication device capable of controlling a mode of the wireless communication based on transmitted/received information.

BACKGROUND ART

Recently, commercialization of driving safety support systems utilizing an on-vehicle communication device which performs inter-vehicle wireless communication is being considered. In the on-vehicle communication device, an information exchange application which transmits/receives information of own vehicle per cycle between other vehicles and itself is typically used. Moreover, in the inter-vehicle wireless communication system, a carrier sense multiple access (CSMA) system has been conventionally used as an access system such that each vehicle transmits information by itself.

When an information exchange application is used in the CSMA system, in a case where the number of vehicles positioned in a communication area increases, communication traffic increases to exceed a communication capacity. Further, in the CSMA system, vehicles transmit information by themselves, and thus a collision of information occurs when the timings at which information is transmitted are the same, which makes it impossible to receive information normally. Therefore, it is conceivable that congestion in which reliability of communication deteriorates may occur, and information through inter-vehicle wireless communication is not transmitted without fail, and accordingly safety support service cannot be provided.

Patent Document 1 discloses the following technology for preventing congestion from occurring in an inter-vehicle wireless communication system. That is, Patent Document 1 discloses the method of controlling a transmission cycle of own vehicle based on a dangerous situation of own vehicle and a traffic amount of channels, to thereby avoid congestion.

Further, in order to reduce congestion in an inter-vehicle wireless communication system, Patent Document 2 discloses the technique of reducing transmission output of inter-vehicle wireless communication as a degree of congestion increases.

Patent Document 1: Japanese Patent Application Laid-Open No. 2006-209333

Patent Document 2: Japanese Patent Application Laid-Open No. 2005-039665

DISCLOSURE OF INVENTION

Problems to be Solved by the Invention

However, in the technology of Patent Document 1, a transmission frequency of own vehicle is changed in accordance with a degree of risk of own vehicle by the information exchange application for transmitting vehicle information of own vehicle in a cycle. For this reason, in order to provide information to a vehicle with high degree of risk, a delay is caused in providing information to the vehicle with high degree of risk unless a transmission frequency of a vehicle which exposes the vehicle with high degree of risk to risk is high.

In addition, in the technology of Patent Document 1, a transmission frequency is changed in accordance with communication traffic. However, in Patent Document 1, it is ambiguous as to whether a transmission frequency is changed even in a communication traffic amount in which a transmission delay is not caused when information is transmitted.

In the technology of Patent Document 2, transmission power is controlled in accordance with a degree of congestion. However, there is no guarantee that, in order to provide information on driving safety support, the application will be set to have a transmission output for securing communication of a required distance. For example, in the technology of Patent Document 2, a degree of congestion increases as closer to an intersection, and hence control is made so as to reduce transmission output. Unfortunately, however, a risk of accident increases as closer to the intersection. Therefore, sufficient transmission power cannot be secured in the vicinity of the intersection by the technology of Patent Document 2.

An object of the present invention is therefore to provide an on-vehicle communication device capable of suppressing a delay in providing information, avoiding congestion, and securing sufficient transmission power.

Means to Solve the Problem

In order to achieve the above-mentioned object, Claim 1 of the present invention relates to an on-vehicle communication device mounted on a first vehicle and wirelessly communicating with at least one second vehicle other than the first vehicle, including: transmitting/receiving means receiving, from the second vehicle, second vehicle information regarding running of the second vehicle and a second communication channel utilization rate indicating a time rate at which a field intensity of a predetermined level or more in the second vehicle is received; and communication control means controlling a first vehicle transmission cycle and first vehicle transmission power when data is transmitted from the transmitting/receiving means, wherein the communication control means: estimates a first degree of risk indicating a degree of risk of the first vehicle by using first vehicle information and the second vehicle information, the first vehicle information being obtained from the first vehicle and relating to running of the first vehicle: estimates a safe distance required for performing deceleration or stop to a predetermined speed using the first vehicle information and the second vehicle information; controls the first vehicle transmission cycle based on a first communication channel utilization rate, the second communication channel utilization rate and the first degree of risk, the first communication channel utilization rate being obtained from the transmitting/receiving means and indicating a time rate at which a filed intensity of a predetermined level or more in the first vehicle is received; and controls the first vehicle transmission power based on the first communication channel utilization rate, the second communication channel utilization rate and the safe distance.

Effects of the Invention

In the on-vehicle communication device according to Claim 1 of the present invention, the communication control means estimates the first degree of risk and the safe distance using the first vehicle information and the second vehicle information. Further, the communication control means controls the first vehicle transmission cycle based on the first communication channel utilization rate, the second communication channel utilization rate and the first degree of risk, and controls the first vehicle transmission power based on the first communication channel utilization rate, the second communication channel utilization rate and the safe distance.

Accordingly, it is possible to provide an on-vehicle communication device capable of suppressing a delay in providing information, avoiding congestion, and sufficiently securing transmission power.

The object, features, aspects, and advantages of the present invention will be more apparent from the following detailed description in conjunction with the attached drawings.

BRIEF DESCRIPTION OF DRAWINGS

FIG. 7 is a figure for describing an example of link budget.

BEST MODE FOR CARRYING OUT THE INVENTION

The present invention will be specifically described below with reference to drawings showing an embodiment thereof.

Embodiment

Figure 1:
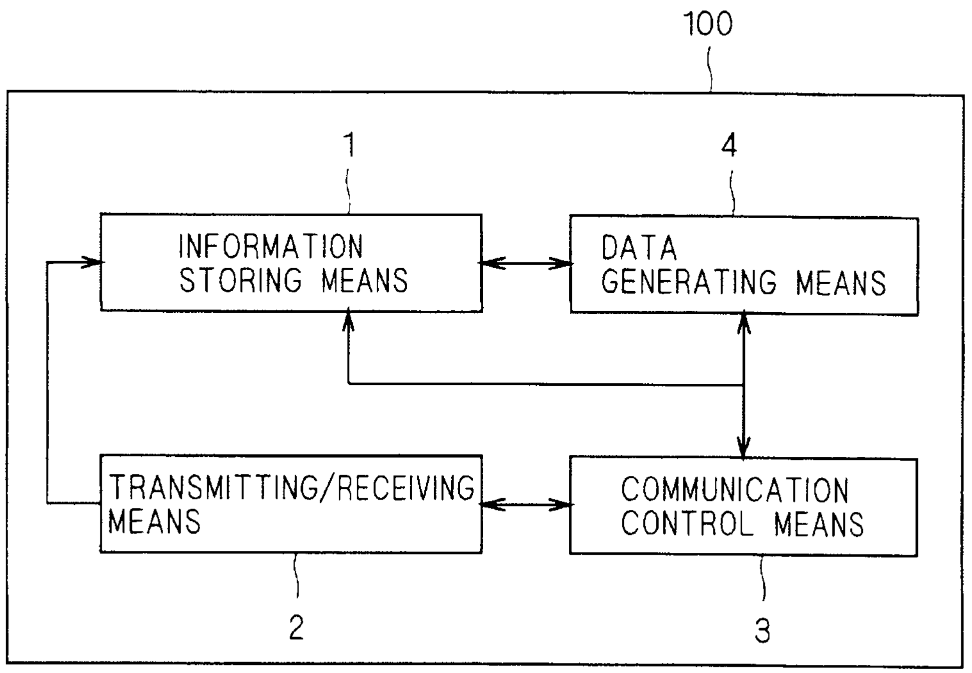
FIG. 1 is a block diagram showing a configuration of an on-vehicle communication device.

FIG. 1 is a block diagram showing a configuration of an on-vehicle communication device 100 according to the present embodiment.

The on-vehicle communication device 100 is mounted on each of a plurality of vehicles. By the on-vehicle communication devices 100, wireless communication is performed between vehicles. Wireless communication herein may employ dedicated short range communication (DSRC) or may employ a protocol used in a local area network (LAN) or a cellular phone.

Note that the description of the present invention will be given by focusing on one vehicle referred to as "own vehicle" (regarded as a first vehicle) in which the on-vehicle communication device 100 is mounted. In addition, a plurality of vehicles other than "own vehicle", in which the on-vehicle communication device 100 is mounted, are referred to as "surrounding vehicles" (regarded as second vehicles).

Referring to FIG. 1, the on-vehicle communication device 100 includes information storing means 1, transmitting/receiving means 2, communication control means 3 and data generating means 4.

The information storing means 1 stores therein vehicle information which is obtained from a sensor of own vehicle and surrounding vehicle information which is obtained from the surrounding vehicles through wireless communication. Further, the information storing means 1 stores therein own vehicle congestion control information which is obtained from own vehicle and surrounding vehicle congestion control information which is obtained from the surrounding vehicles through wireless communication.

Herein, vehicle information refers to information regarding running of a vehicle, which is vehicle information such as a speed, acceleration/deceleration, a position, a driving lane, and ON/OFF of a blinker. Further, the congestion control information refers to information such as a degree of risk for indicating a degree of risk of a vehicle, transmission power, a transmission cycle, a communication channel utilizing rate, reception sensitivity and carrier sense sensitivity. Moreover, the communication channel utilization rate refers to a time rate at which a field intensity of a predetermined level or higher is received.

The transmitting/receiving means 2 performs wireless communication with the on-vehicle communication device 100 mounted on the surrounding vehicle, and transmits/receives information. The transmitting/receiving means 2 receives the surrounding vehicle information (regarded as second vehicle information) and surrounding congestion control information from surrounding vehicles.

As can be seen from the above, the surrounding congestion control information includes a communication channel utilization rate (regarded as a second communication channel utilization rate) and a degree of risk of a surrounding vehicle (regarded as a second degree of risk). In addition, the surrounding congestion control information further includes a transmission cycle (regarded as a second vehicle transmission cycle), transmission power (regarded as second vehicle transmission power) and a reception sensitivity (regarded as a second vehicle reception sensitivity) in wireless communication of surrounding vehicles.

Further, the transmitting/receiving means 2 is capable of obtaining a communication channel utilization rate (regarded as a first communication channel utilization rate) in wireless communication of own vehicle. In addition, the transmitting/receiving means 2 is capable of switching transmission power when transmitting data (information).

The communication control means 3 controls a transmission cycle (regarded as a first vehicle transmission period) and transmission power (regarded as first vehicle transmission power) of own vehicle when the data (information) is transmitted from the transmitting/receiving means 2.

Specifically, the communication control means 3 determines a transmission cycle for securing reliability of communication, based on the communication channel utilization rate of own vehicle which is obtained from the transmitting/receiving means 3, the surrounding vehicle congestion control information which is stored in the information storing means 1 and the degree of risk (regarded as a first degree of risk) of own vehicle. Moreover, the communication control means 3 determines transmission power for satisfying a communication distance required by an application, with the use of a safe distance which will be described below. Then, the communication control means 3 controls transmission per transmission cycle which has been determined, and controls the transmitting/receiving means 3 so as to obtain the determined transmission power.

Here, the communication control means 3 estimates a degree of risk of own vehicle from the own vehicle information (regarded as first vehicle information) which is obtained from own vehicle and stored in the information storing means 1 and from the surrounding vehicle information which is received from the transmitting/receiving means 2 and stored in the information storing means 1.

The data generating means 4 generates, at a predetermined timing, transmission data which includes at least the own vehicle information stored in the information storing means 1, the communication channel utilization rate of own vehicle which is obtained by the transmitting/receiving means 2, and the degree of risk of own vehicle which is estimated by the communication control means 3. Then, the generated transmission data is transmitted to the transmitting/receiving means 2, and the transmitting/receiving means 2 transmits the transmission data generated by the data generating means 4 under control of the communication control means 3.

Here as the predetermined timing, there may be employed a cyclic timing set in advance or a random timing at which a brake is suddenly applied or the blinker is turned on.

Alternatively, the data generating means 4 may generate the transmission data including not only the vehicle information of own vehicle but also information required by a driver or entertainment information. Further, the data generating means 4 may generate the transmission data including types of data, priorities of data, and other information (in particular, own vehicle congestion control information) stored in the information storing means 1.

The on-vehicle communication device 100 carries out, with the configuration described above, communication using the transmission power and transmission cycle calculated from the information of own vehicle and surrounding vehicles, to thereby avoid congestion. For example, the on-vehicle communication device 100 is capable of carrying out communication using appropriate transmission power and transmission cycle so as to avoid congestion in a case where the communication channel utilization rate becomes high. In addition, the transmission power and transmission cycle are set based on the degree of risk which is estimated by own vehicle, the degree of risk which is received from the surrounding vehicle and the like, to thereby avoid congestion. Moreover, in accordance with priorities of data, it is possible to set transmission power or transmit it in order of priority.

Note that the transmitting/receiving means 2 may receive position information of a surrounding vehicle from the surrounding vehicle, and the communication control means 3 may calculate a relative distance between the surrounding vehicle and own vehicle from position information of own vehicle which is obtained by own vehicle and the position information of the surrounding vehicle which is received by the transmitting/receiving means 2. In this case, the communication control means 3 may control transmission power when own vehicle transmits data (information), based on the calculated relative distance.

Further, geographical conditions such as an intersection are taken into consideration, and thus the communication control means 3 may control the transmission power of own vehicle based on map information set in advance in own vehicle and the relative distance.

Further, not only the geographical conditions such as an intersection and the position information of a vehicle, but also a motion of own vehicle is taken into consideration, and thus the communication control means 3 may control the transmission power of own vehicle, based on acceleration information and position information of own vehicle which are capable of being obtained from own vehicle and the map information.

Figure 2:
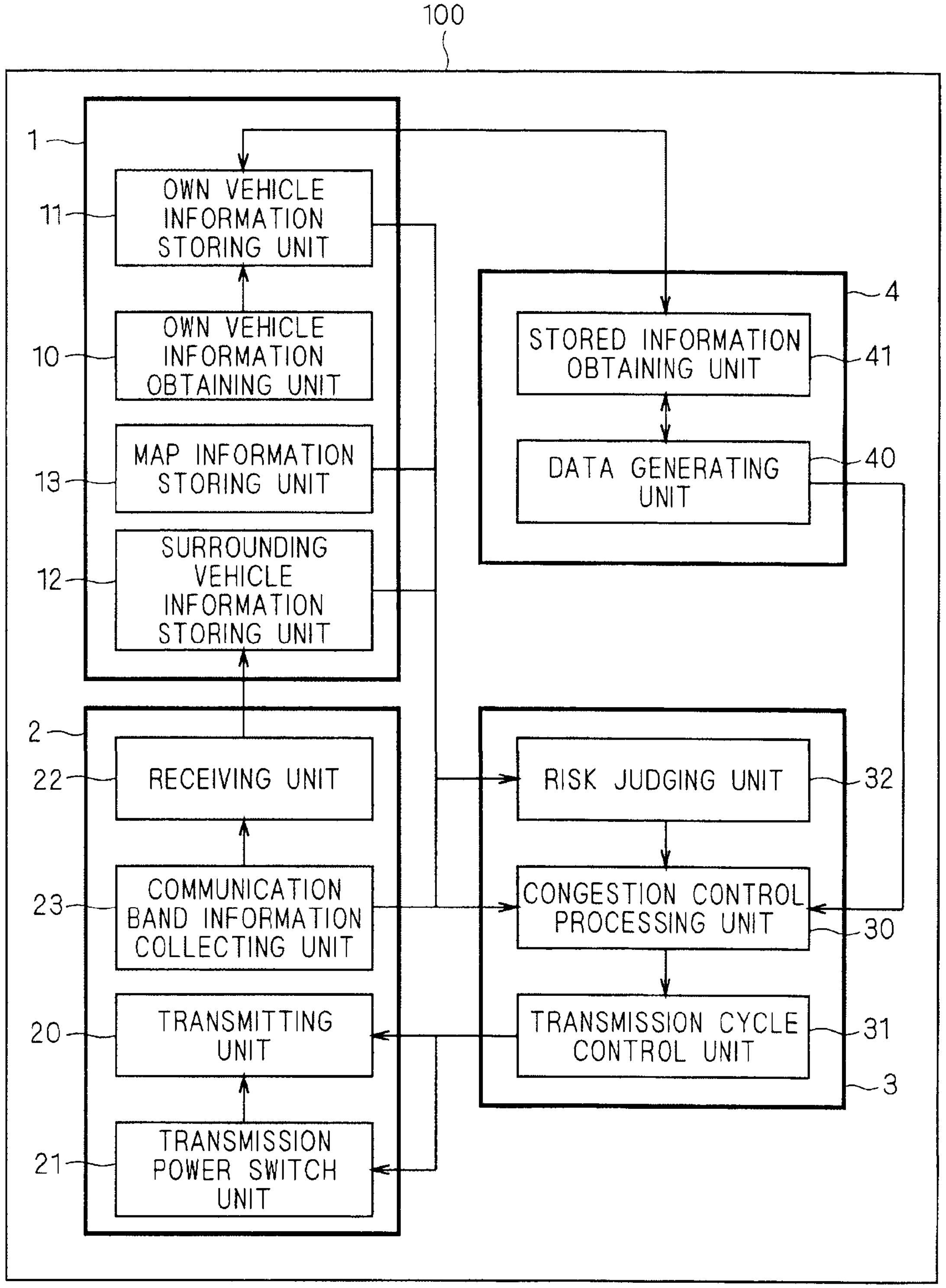
FIG. 2 is a block diagram showing a detailed configuration of the on-vehicle communication device.

FIG. 2 is a block diagram showing the configuration of the on-vehicle communication device 100 in more detail. In the drawing, the same reference numerals will be used through the drawings and the following detailed description to refer to the same or like parts.

Referring to FIG. 2, functions of blocks 1 to 4 arranged in the on-vehicle communication device 100 will be described in more detail.

The function of the information storing means 1 is now described in more detail.

The information storing means 1 includes an own vehicle information obtaining unit 10, an own vehicle information storing unit 11, a surrounding vehicle information storing unit 12 and a map information storing unit 13.

The own vehicle information obtaining unit 10 obtains own vehicle information such as a speed, acceleration/deceleration, a position, a driving direction, and ON/OFF of a blinker from a sensor of own vehicle, a global positioning system (GPS) or the like. Then, the own vehicle information obtaining unit 10 stores the obtained own vehicle information in the own vehicle information storing unit 11.

The own vehicle information storing unit 11 stores the own vehicle information, and further stores the own vehicle congestion control information which has been determined by a congestion control processing unit 30.

The surrounding vehicle information storing unit 12 stores the surrounding vehicle information and surrounding vehicle congestion control information which have been transmitted from the surrounding vehicle and received by a receiving unit 22.

The map information storing unit 13 stores map information, road and terrain information, traffic sign information, traffic restriction information and the like.

The function of the transmitting/receiving means 2 is now described in more detail.

The transmitting/receiving means 2 includes a transmitting unit 20, a transmission power switch unit 21, the receiving unit 22 and a communication channel information collecting unit 23.

The transmitting unit 20 transmits the transmission data generated by a data generating unit 40 to the surrounding vehicles by broadcast transmission or to a specific vehicle by unicast transmission.

The transmission power switch unit 21 switches from the transmission power when transmission is performed by the transmitting unit 20 to the transmission power determined by the congestion control processing unit 30.

The receiving unit 22 receives the information transmitted from the surrounding vehicles, and transmits the received information to the surrounding vehicle information storing unit 12. In addition, the receiving unit 22 is capable of changing a reception sensitivity. Here, the reception sensitivity refers to a power threshold for enabling reception of the information transmitted from the surrounding vehicles.

The communication channel information collecting unit 23 judges, as busy, a case of receiving a field intensity equal to or higher than the carrier sense sensitivity on a communication channel, and observes the communication channel for a certain period of time. Then, the communication channel information collecting unit 23 measures a busy rate of that period as a communication channel utilization rate. The communication channel information collecting unit 23 stores the measured communication channel utilization information in the own vehicle information storing unit 11, and transmits it to the congestion control processing unit 30. In addition, the communication channel information collecting unit 23 is capable of changing the carrier sense sensitivity. Here, the carrier sense sensitivity refers to a power threshold for judging that the communication channel is in use (busy).

The function of the communication control means 3 is now described in more detail.

The communication control means 3 includes the congestion control processing unit 30, a transmission cycle control unit 31 and a degree of risk judging unit 32.

The congestion control processing unit 30 uses a communication channel utilization rate of own vehicle which is obtained from the communication channel information collecting unit 23, a communication channel utilization rate of a surrounding vehicle which is obtained from the surrounding vehicle information storing unit 12, a degree of risk of own vehicle, and a distance (referred to as a safe distance) required for avoiding a risk such as a collision with a surrounding vehicle, to thereby determine transmission power of own vehicle and a transmission cycle of own vehicle so as to prevent congestion from occurring. Here, the degree of risk of own vehicle and the safe distance are estimated by the risk judging unit 32. In addition, the congestion control processing unit 30 determines the transmission power and a transmission order of the above based on a data priority added by the data generating unit 40.

The transmission cycle control unit 31 transmits the information generated by the data generating unit 40 to the transmitting unit 20 after a lapse of a transmission cycle time from the last transmission time, based on the transmission cycle determined by the congestion control processing unit 30. The transmitting unit 20 transmits the received information to the surrounding vehicles. In addition, the transmission cycle control unit 31 instantly transmits information other than the data generated in a cycle by the data generating unit 40 and the transmission power set by the congestion control processing unit 20 to the transmitting unit 20, based on types of data which are added by the data generating unit 40.

The risk judging unit 32 estimates a degree of risk as to whether own vehicle is exposed to risk and the safe distance. Here, the estimation is individually made based on speed information, acceleration/deceleration information and position information of own vehicle which are obtained from the own vehicle information storing unit 11, speed information, acceleration/deceleration information and position information of the surrounding vehicles which are obtained from the surrounding vehicle information storing unit 12, and map information or the like (specifically, information on intersection) which is obtained from the map information storing unit 13.

The function of the data generating means 4 is now described in more detail.

The data generating means 4 includes the data generating unit 40 and a stored information obtaining unit 41.

The data generating unit 40 obtains pieces of information of own vehicle from the own vehicle information storing unit 11 by means of the stored information obtaining unit 41 to generate transmission data including the obtained pieces of information, and transmits it to the surrounding vehicles. The transmission data generated by the data generating unit 40 is transmitted to the transmitting unit 20 via the congestion control processing unit 30 and the transmission cycle control unit 31, and is transmitted to the surrounding vehicles by the transmitting unit 20. The data generating unit 40 generates data in a cycle or randomly as described above.

The stored information obtaining unit 41 obtains the pieces of information regarding own vehicle which are stored in the own vehicle information storing unit 11 from the own vehicle information storing unit 11.

Figure 4:
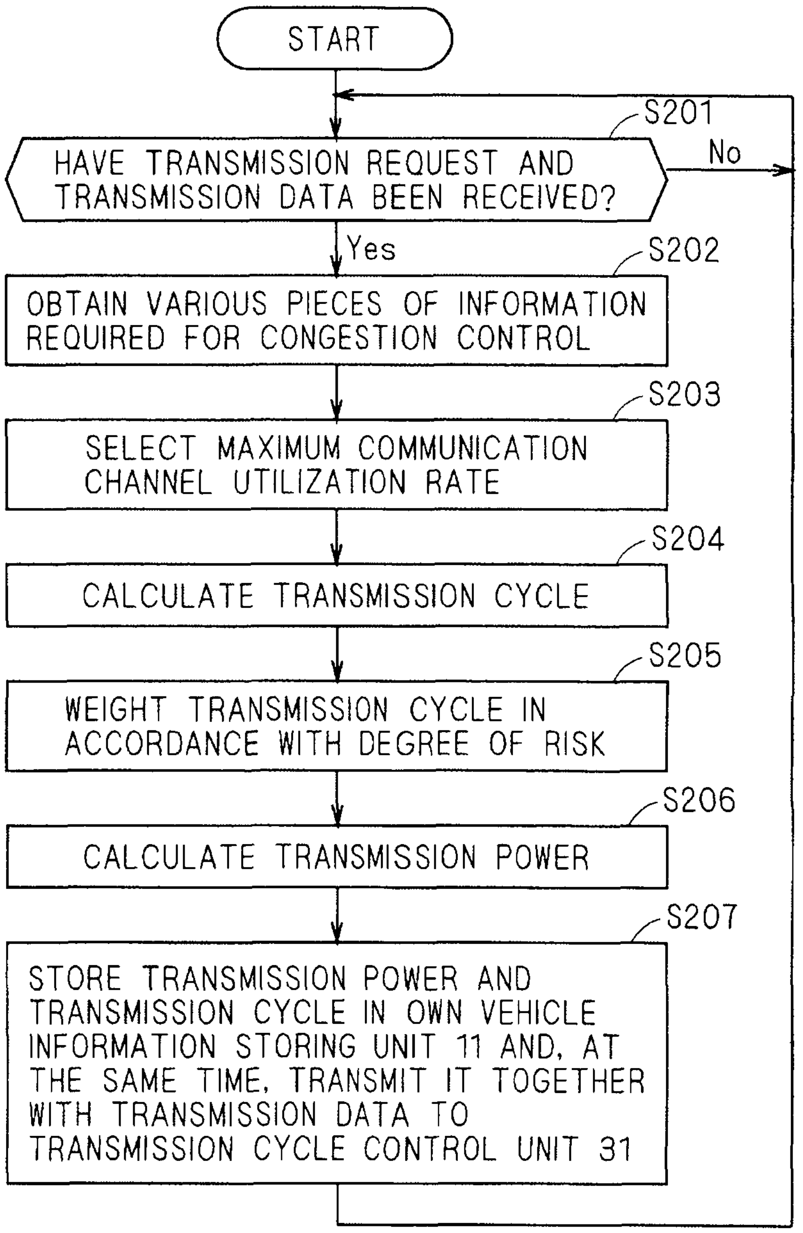
FIG. 4 is a flowchart showing a procedure of congestion control processing.
Figure 5:
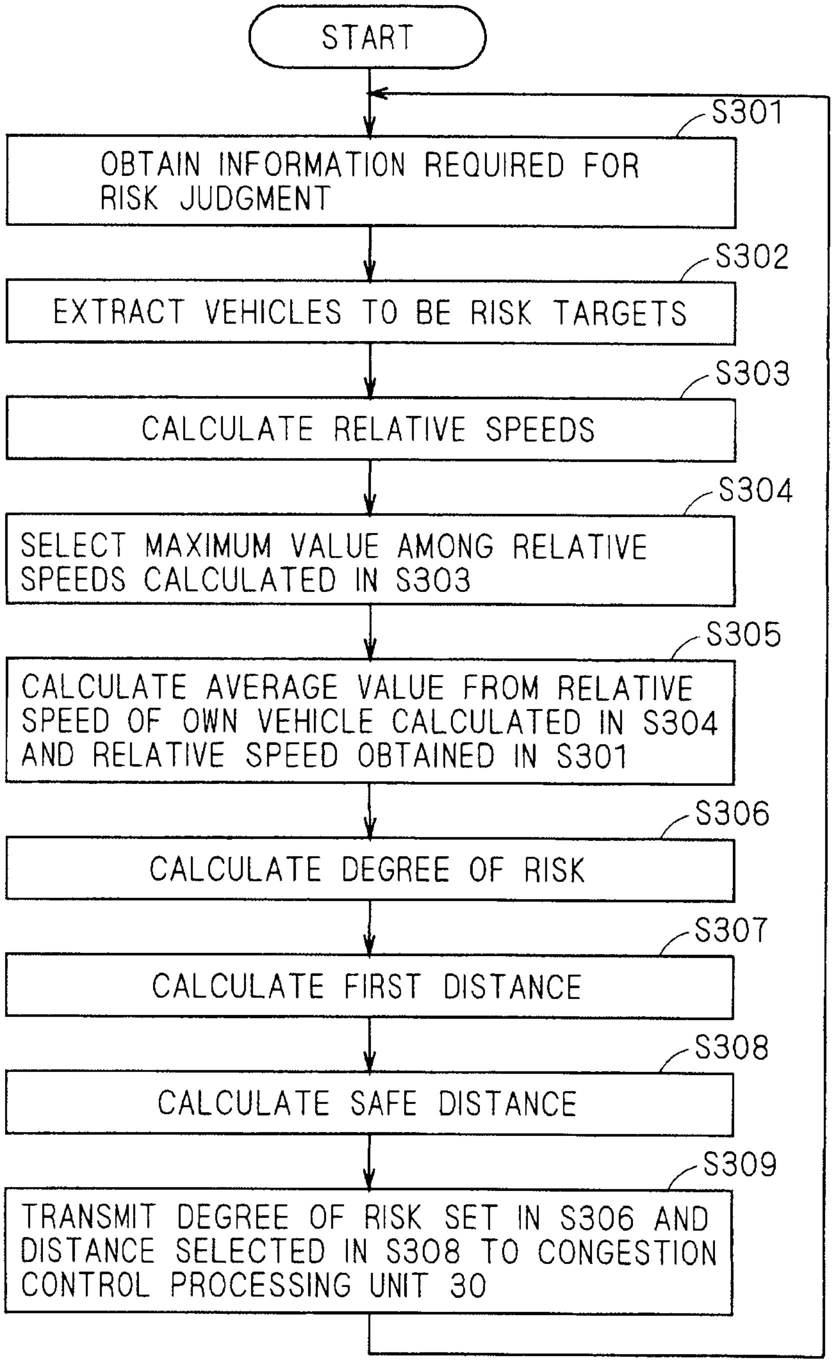
FIG. 5 is a flowchart showing a procedure of estimating a degree of risk and a safe distance.

Next, with reference to flowcharts shown in FIG. 3, FIG. 4 and FIG. 5, an operation of the on-vehicle communication device 100 according to the present embodiment will be described.

Figure 3:
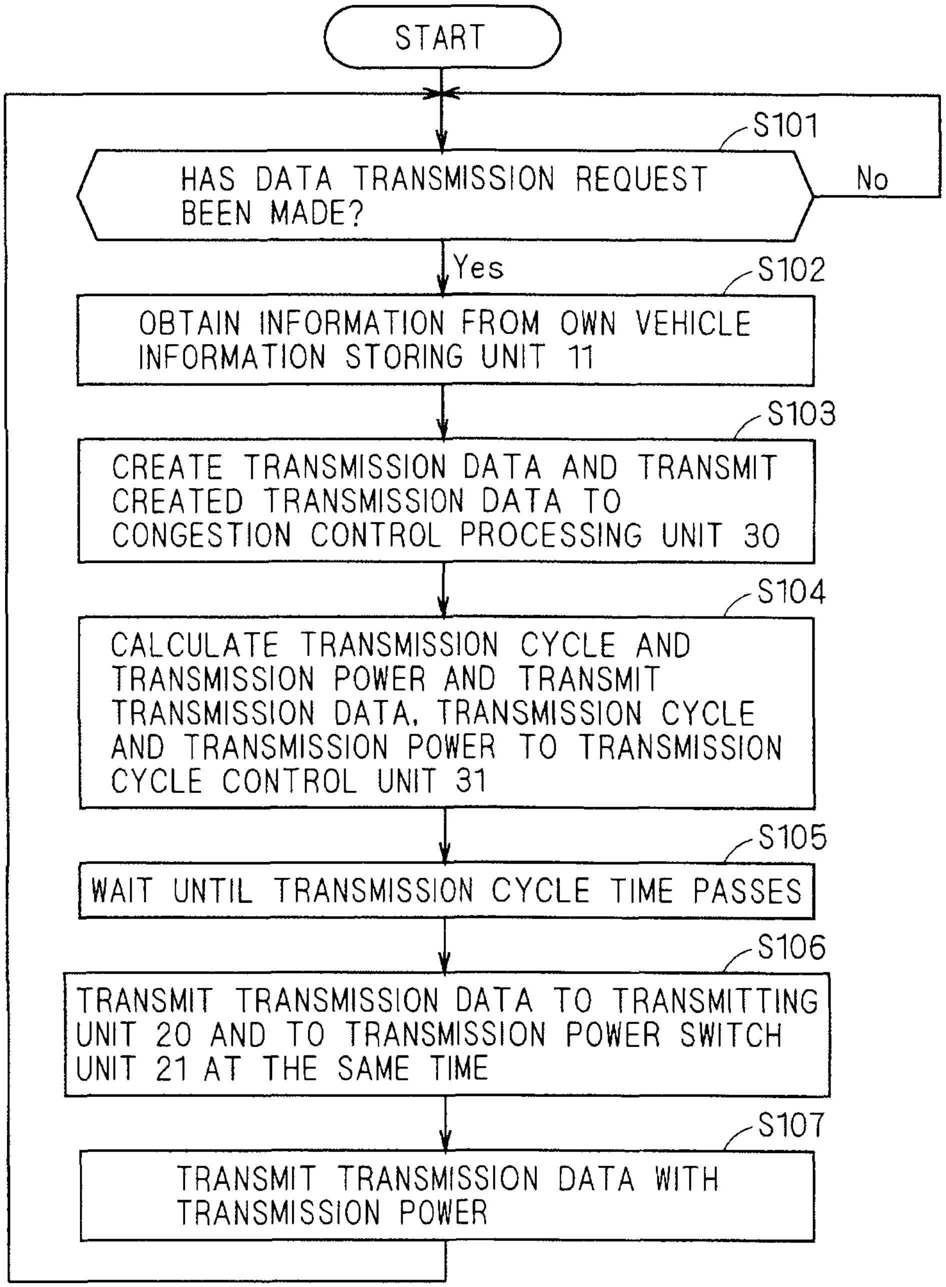
FIG. 3 is a flowchart showing a procedure of data transmission processing.

FIG. 3 is the flowchart showing a data transmission processing procedure of the on-vehicle communication device 100. FIG. 4 is the flowchart showing a congestion control processing procedure of the communication control means 2 included in the on-vehicle communication device 100. FIG. 5 is the flowchart showing the procedure of estimation by the risk judging unit 32 included in the on-vehicle communication device 100 as to whether "own vehicle is exposed to risk (degree of risk)" and calculation (estimation) of "the distance (safe distance) required for safe stop/deceleration".

(Data Transmission Processing Procedure)

First, the flowchart of FIG. 3 (data transmission processing procedure) will be described.

The data generating means 4 judges whether or not a data transmission request is made in the data generating unit 40 (Step S101). In a case where the data transmission request is not made ("No" in Step S101), the data generating means 4 continues judgment of Step S101 until the data transmission request is made. On the other hand, in a case where the data transmission request is made ("Yes" in Step S101), the process proceeds to Step S102.

In Step S102, the stored information obtaining unit 41 obtains the pieces of information regarding own vehicle which are stored in the own vehicle information storing unit 11.

Next, in Step S103, the data generating unit 40 which has made the data transmission request creates (generates) transmission data based on the pieces of information obtained in Step S102. Then, the data generating unit 40 transmits the created transmission data to the congestion control processing unit 30 (Step S103).

Then, in Step S104, the congestion control processing unit 30 calculates a transmission cycle of own vehicle and transmission power of own vehicle for controlling congestion. Further, the congestion control processing unit 30 transmits the calculated transmission cycle and transmission power and the received transmission data to the transmission cycle control unit 31 (Step S104). Here, the transmission cycle and transmission power, communication channel utilization rate, reception sensitivity, carrier sense sensitivity and the like which are used by the congestion control processing unit 30 may be added to the transmission data to be transmitted to the transmission cycle control unit 31.

In Step S105, the transmission cycle control unit 31 sets the received transmission cycle in the transmission cycle control unit 31. Then, in accordance with the set transmission cycle, the transmission cycle control unit 31 waits transmission of transmission data until the transmission cycle time passes from the last transmission (Step S105).

Then, after a lapse of the transmission cycle time, the transmission cycle control unit 31 transmits the transmission data to the transmitting unit 20 (Step S106). At the same time, the transmission cycle control unit 31 transmits the set transmission power to the transmission power switch unit 21 (Step S106).

In Step S107, the transmission power switch unit 21 sets the received transmission power in the transmission power switch unit 21. Then, the transmitting unit 20 wirelessly transmits the transmission data using the transmission power set by the transmission power switch unit 21 (Step S107).

As described above, the transmission processing procedure regarding transmission of the transmission data is completed. Note that the process returns to Step S101 after the completion of Step S107, and the process from Step S101 to Step S107 is repeatedly executed.

(Congestion Control Processing Procedure)

Next, the flowchart of FIG. 4 (congestion control processing procedure by the communication control means 2) will be described.

The congestion control processing unit 30 judges whether or not to receive the transmission request and transmission data from the data generating unit 40 (Step S201). In a case where the transmission request and transmission data are not received ("No" in Step S201), the congestion control processing unit 30 continues judgment of Step S201 until the transmission request and transmission data are received. On the other hand, in a case where the transmission request and transmission data are received ("Yes" in Step S201), the process proceeds to Step S202.

Next, the congestion control processing unit 30 obtains pieces of information required for a series of congestion control (calculation of the transmission power and the transmission cycle) (Step S202). The required pieces of information include a communication channel utilization rate of own vehicle which is obtained from the communication channel information collecting unit 23, the degree of risk and the safe distance which are obtained from the risk judging unit 32, information regarding own vehicle which is obtained from the own vehicle information storing unit 11 (such as acceleration, transmission power and transmission cycle), information regarding surrounding vehicles which is obtained from the surrounding vehicle information storing unit 12 (such as communication channel utilization rate, transmission power, transmission cycle and degree of risk), and intersection information which is obtained from the map information storing unit 13.

Next, the congestion control processing unit 30 selects, as a maximum value Omax(t), a maximum communication channel utilization rate among a communication channel utilization rate Oi(t) of own vehicle and communication channel utilization rates Oj(t) of the surrounding vehicles (Step S203). That is, the maximum value Omax(t)=max{Oi(t), Oj(t)} (j=1, . . . , N). Here, "N" represents the number of surrounding vehicles capable of communicating with own vehicle.

Figure 6:
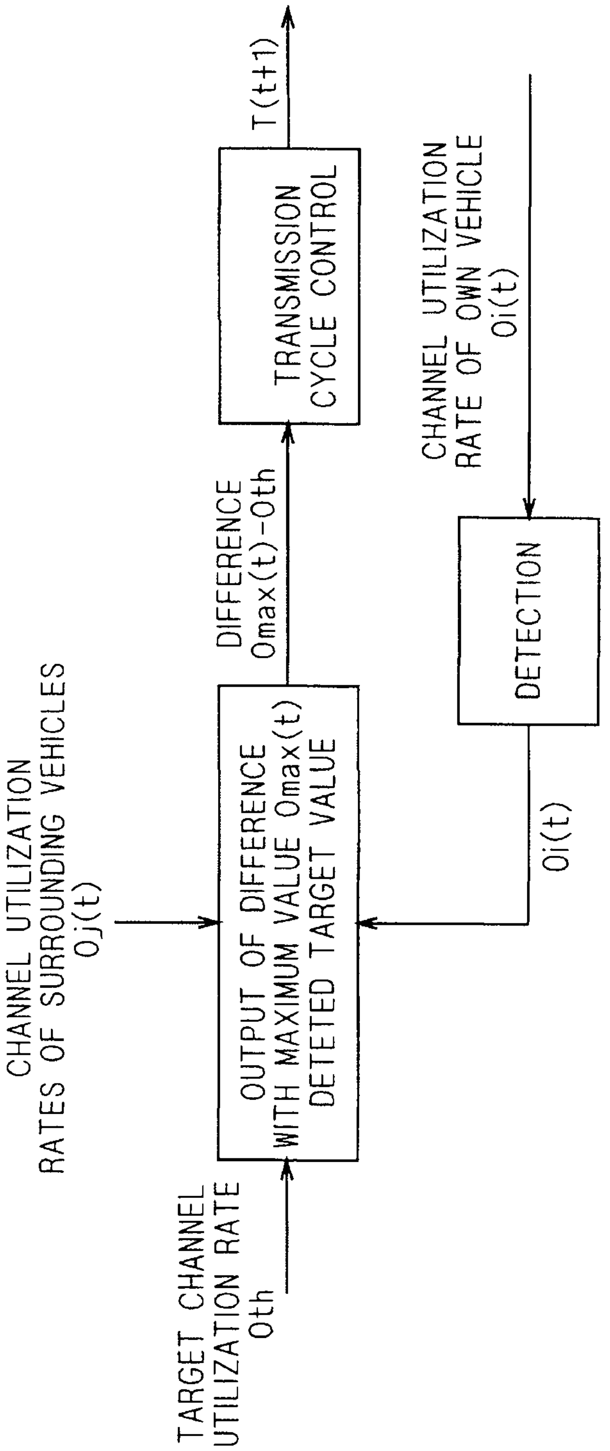
FIG. 6 is a diagram for describing feedback control in the congestion control processing.

Next, the congestion control processing unit 30 calculates a transmission cycle based on the maximum value Omax(t) selected in S203 (Step S204). Specifically, as expressed by Equation (1) below, the transmission cycle T is calculated so as to converge on a target communication channel utilization rate Oth, based on the maximum value Omax(t). FIG. 6 shows a circuit configuration for enabling an arithmetic operation of Equation (1) below. As shown in FIG. 6, in the circuit, the channel utilization rate Oi(t) of own vehicle and the channel utilization rates Oj(t) of the surrounding vehicles are used for controlling a transmission cycle based on a difference between the target communication channel utilization rate Oth and the maximum value Omax(t), to thereby calculate the transmission cycle T.

$$T(t+1) = T(t) + K \times \{O\max(t) - Oth\} + K/I \times \int \{O\max(t) - Oth\}dt + K \times Td \times \frac{d}{dt}\{O\max(t) - Oth\} \quad (1)$$

In Equation (1), T(t+1) and T(t) represent a transmission cycle of next transmission and the last-set transmission cycle, respectively. Omax(t), K, I and Td represent the maximum value selected in S203, a proportional gain, an integration time and a derivative time, respectively. A time required for converging the communication channel utilization rate on the target communication channel utilization rate Oth is changed by set values of the proportional gain K, integration time 1 and derivative time Td.

Alternatively, as the T(t) in this case, the last-set transmission cycle of own vehicle may be used, or an average value of transmission cycles of own vehicle which have been set several times may be used. Still alternatively, as T(t), an average value of the transmission cycle of own vehicle and the transmission cycles of the surrounding vehicles may be used.

The target communication channel utilization rate Oth may be a fixed value defined in advance or a variable value fluctuating with a road shape, based on the intersection information obtained by the map information storing unit 13.

Next, the congestion control processing unit 30 weights the transmission cycle calculated in Step S204 in accordance with a degree of risk (Step S205). Here, the transmission period T(t+1) is multiplied by a degree of risk R calculated by the risk judging unit 32 as expressed by Equation (2) below.

$$T'(t+1)=T(t+1)\times R \quad (2)$$

In Equation (2), as the degree of risk (R), only the degree of risk of own vehicle which has been calculated by the risk judging unit 32 may be directly used, or a value obtained from a distribution obtained from the degree of risk using the degree of risk of own vehicle and the degrees of risk of the surrounding vehicles. For example, in a case where the distribution of relative speeds is an exponential distribution, the degree of risk R is defined as Equation (3) below.

$$R=\exp\{-a(V-V')\}+b \quad (3)$$

In Equation (3), a and b represent coefficients, V represents a relative speed with respect to the surrounding vehicles of own vehicle, and V' represents an average relative speed of own vehicle with respect to the surrounding vehicles. In this case, R is set so as to be larger than one if the degree of risk of own vehicle is larger than the average value, and set so as to be smaller than one if it is smaller than the average value.

In Step S205, the congestion control processing unit 30 may set the transmission cycle of own vehicle to the transmission cycle required by the surrounding vehicles, based on the degree of risk of own vehicle and the degree of risk of the surrounding vehicle. For example, in a case where the degree of risk of the surrounding vehicle is higher than the degree of risk of own vehicle, the transmission cycle of own vehicle is set to be larger than the set transmission cycle of the surrounding vehicle.

Further, a maximum value and a minimum value may be set in advance in the congestion control processing unit 30. Then, in Step S205, if a calculated transmission cycle is larger than the maximum value, the congestion control processing unit 30 sets the calculated transmission cycle to the maximum value as a transmission cycle. On the other hand, if the calculated transmission cycle is smaller than the minimum value, the congestion control processing unit 30 may set the calculated transmission cycle to the minimum value as a transmission cycle.

In place of weighting of the degree of risk R, the transmission cycle for controlling congestion may be weighted by calculating a relative speed, relative distance, position relationship and the like from the own vehicle information and surrounding vehicle information, based on a time to collision (TTC) estimated for collision between own vehicle and a surrounding vehicle. That is, the transmission cycle is set to be short if the time for collision between own vehicle and a surrounding vehicle is short, while the transmission cycle is set to be long if the time for collision is sufficiently long.

In order to control congestion, the transmission cycle which is used in, for example, an information exchange application for suppressing a communication channel utilization rate to a certain level or lower is calculated (set). That is, the transmission cycle is set to be long if the communication channel utilization rate is equal to or higher than a certain level, whereas the transmission cycle is set to be short if the communication channel utilization rate is equal to or lower than the certain level and the channel has room. Note that though the congestion control processing unit 30 may control the transmission cycle in accordance with the communication channel utilization rate of own vehicle, in the description above, the congestion control processing unit 30 uses the maximum value Omax(t) obtained from the channel utilization rate of a surrounding vehicle and the channel utilization rate of own vehicle.

Figure 8:
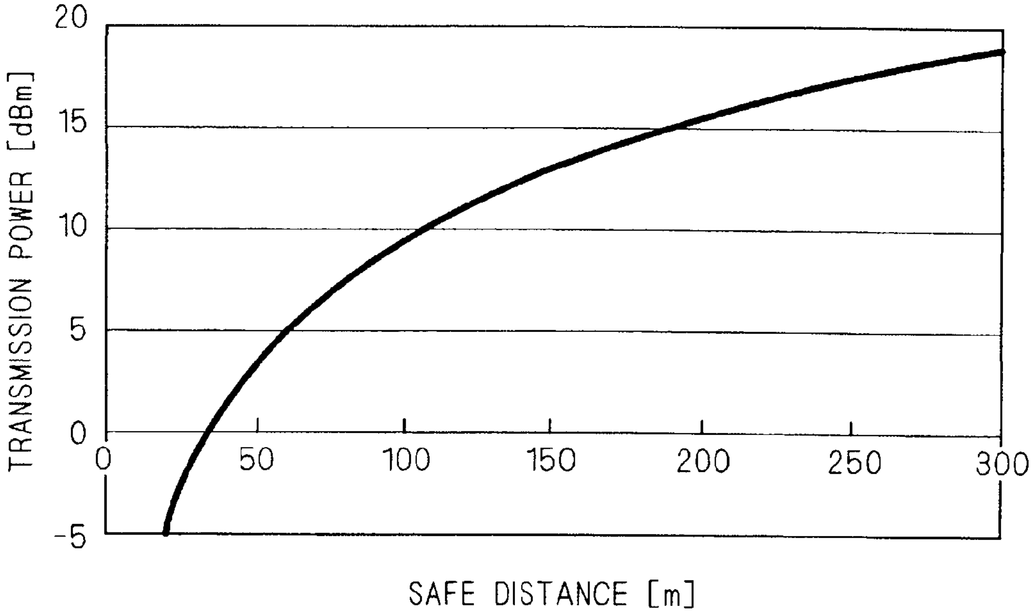
FIG. 8 is a figure for describing an example of calculating transmission power.

Next, a transmission power value P(t) satisfying the safe distance Ds(t) obtained from the risk judging unit 32 is calculated (Step S206). Calculation of the safe distance Ds(t) will be described in detail in the heading "procedure of estimating degree of risk and safe distance" below. The transmission power P(t) satisfying the safe distance Ds(t) is uniquely obtained from actually-assumed design budget. For example, the line budget is made in accordance with communication specifications shown in FIG. 7, and thus the transmission power value P(t) with respect to the safe distance Ds(t) is uniquely calculated from a graph of FIG. 8 which shows the relationship between transmission power (dBm) and safe distance (m).

Further, the transmission power for controlling congestion may be set to a minimum required transmission output in consideration of only a distance (relative distance) between own vehicle and the surrounding vehicle or in consideration of the relative distance and a reception sensitivity of the surrounding vehicle as well. Note that needless to say, the relative distance is obtained from the position information of the surrounding vehicle which is received from the surrounding vehicle and the position information of the own vehicle which is obtained from own vehicle. Alternatively, as described below, the transmission power may be set based on map information, a position relationship (regarded as the relative distance) and acceleration information of a group of vehicles when the vehicles are approaching an intersection in cooperation with each other.

The reception sensitivity and carrier sense sensitivity for controlling congestion may be set to a minimum required reception sensitivity and carrier sense sensitivity in consideration of only the distance (relative distance) between own vehicle and a surrounding vehicle or in consideration of the relative distance and transmission power of the surrounding vehicle as well. Note that the reception sensitivity is set to be small in a case of increasing an area for receiving information from surrounding vehicles, while the reception sensitivity is set to be large in a case of reducing the area. In addition, the carrier sense sensitivity is set to be small in a case of detecting vehicles which are positioned in the distance and transmit radio waves, while the carrier sense sensitivity is set to be large in a case where it is only required to detect nearby vehicles.

The transmission power in Step S206 may be set (calculated) also using a degree of risk of a surrounding vehicle. Alternatively, in order to communicate with a surrounding vehicle having a high degree or risk, the transmission power may be set (calculated) so as to be equal to or higher than the reception sensitivity of the surrounding vehicle. For example, in a case where a degree of risk of a surrounding vehicle is higher than a degree of risk of own vehicle, transmission power of own vehicle is set to be lower than transmission power set in the surrounding vehicle. Alternatively, transmission power for enabling communication may be obtained also in consideration of a reception sensitivity set in a surrounding vehicle and a relative distance between the surrounding vehicle and own vehicle.

Figure 9:
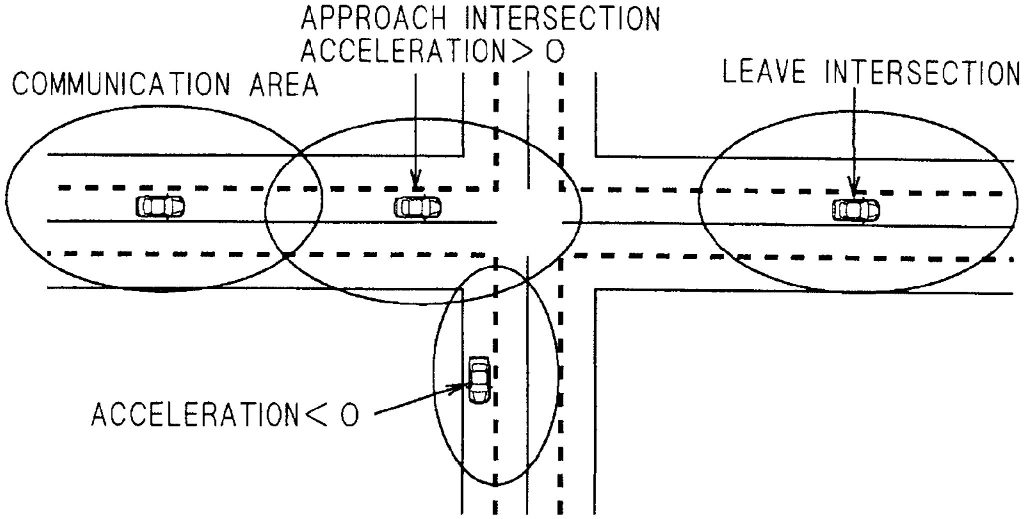
FIG. 9 is a diagram showing an example of setting transmission power.

Further, in Step S206, when intersection information obtained from the map information storing unit 13 reveals that own vehicle is approaching an intersection, transmission power may be set in accordance with acceleration of own vehicle. For example, as shown in FIG. 9, transmission power is set to be low in a case where own vehicle is approaching an intersection and acceleration is negative (deceleration). Meanwhile, transmission power is set to be high in a case where own vehicle is approaching the intersection and acceleration is positive (acceleration). Further, transmission power is set to be high in a case where own vehicle is leaving the intersection. Circled areas in FIG. 9 conceptually show a magnitude of the transmission power.

Figure 10:
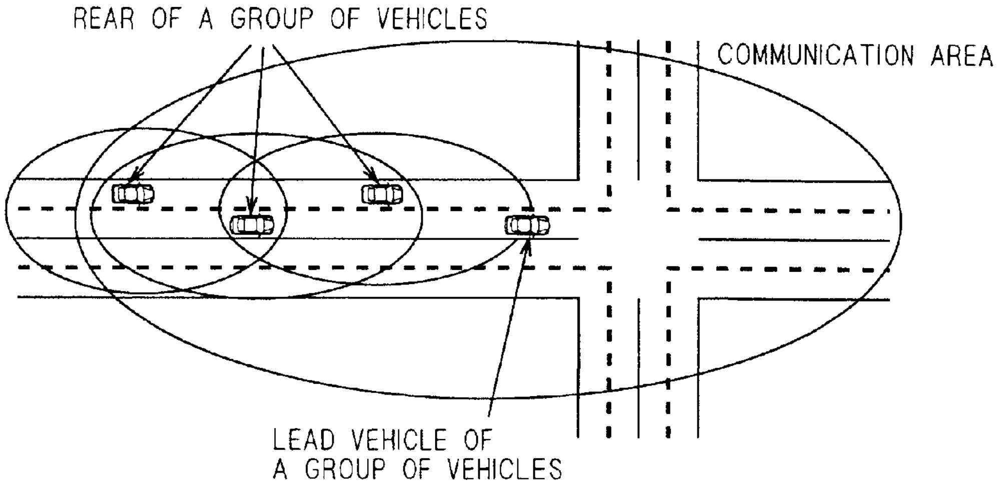
FIG. 10 is another diagram showing an example of setting transmission power.

Further, in Step S206, transmission power may be set also in consideration of which position of a group of vehicles own vehicle is running when approaching an intersection, from intersection information and a relative distance (distance between vehicles which is derived from position information of a surrounding vehicle and position information of own vehicle). For example, transmission power is set to be high in a case where own vehicle is running ahead of a group of vehicles when approaching an intersection, as shown in FIG. 10. On the other hand, transmission power is set to be low in a case where own vehicle is running in the rear of a group of vehicles when approaching the intersection. Circled areas in FIG. 10 conceptually show a magnitude of the transmission power.

Further, feedback control may be applied to the calculation of transmission power in Step S206 as in Equation (1), and transmission power may be calculated such that the number of surrounding vehicles which communicate with own vehicle is equal to or less than a certain number. For example, the communication channel utilization rate O(t) of own vehicle is calculated from the transmission cycles Tj(t) (j=1, . . . , N) received from surrounding vehicles and the number of surrounding vehicles capable of communicating with own vehicle which are grasped by own vehicle, as expressed by Equation (4) below.

$$O(t)=\Sigma\{1/Tj(t)\}\times S/C \qquad (4)$$

Here, a sum of Σ is obtained from j=1 to the number of vehicles N. In addition, in Equation (4), S and C represent a data size (bit) for transmission and a transmission speed (bps), respectively.

Next, the number of communicating vehicles m for causing the communication channel utilization rate O(t) to be smaller than the target channel utilization rate Oth is calculated. Then, transmission power may be set as expressed by Equation (5) below such that the number of surrounding vehicles capable of communicating with own vehicle converges on the number m.

$$P(t+1) = P(t) + K\times\{N(t)-m\} + K/I\times\int\{N(t)-m\}dt + K\times Td\times\frac{d}{dt}\{N(t)-m\} \qquad (5)$$

In Equation (5), P(t+1) and P(t) represent transmission power for next transmission and the last-set transmission power. In addition, N(t), K, I and Td represent the number of surrounding vehicles currently communicating with own vehicle, a proportional gain, an integration time and a derivative time, respectively.

Alternatively, in place of controlling transmission power, an area capable of being received by own vehicle may be limited by controlling a reception sensitivity or carrier sense sensitivity. For example, the reception sensitivity and carrier sense sensitivity are changed by a difference P(t+1)-P(t) in a case of changing the transmission power from P(t) to P(t+1).

Next, the congestion control processing unit 30 stores the calculated transmission power and transmission cycle in the own vehicle information storing unit 11 (Step S207). At the same time, the congestion control processing unit 30 adds the transmission power, transmission cycle, reception sensitivity and communication channel utilization rate to the transmission data transmitted by the data generating unit 40, and transmits the added transmission data to the transmission cycle control unit 31 (Step S207).

As can be seen from the above, a series of processing procedures (Steps S201 to S207) of the congestion control processing unit 30 is completed, and the completed contents are repeatedly executed.

(Procedure of Estimating Degree of Risk and Safe Distance)

Next, the flowchart of FIG. 5 (procedure of processing such as estimation (calculation) of a degree of risk and estimation (calculation) of a safe distance) will be described.

First, the risk judging unit 32 obtains information required for the following risk judgment (estimation of a degree of risk and a safe distance) (Step S301). The information required for risk judgment includes own vehicle information (for example, information such as a speed, acceleration, position and running direction of own vehicle) from the own vehicle information storing unit 11 and surrounding vehicle information (for example, information such as a speed, acceleration, position and running direction of a surrounding vehicle, a degree of risk, and relative speed information with a vehicle exposing a surrounding vehicle to risk which has been judged by the surrounding vehicle) from the surrounding vehicle information storing unit 12.

Next, the risk judging unit 32 extracts vehicles having a risk of collision among own vehicle and the surrounding vehicles (Step S302). For example, in this case, own vehicle and the surrounding vehicles run in the same running direction, and vehicles in front of and behind own vehicle are extracted as targets.

Then, the risk judging unit 32 individually calculates relative speeds of the extracted vehicles and own vehicle (Step S303). In this case, the relative speeds are calculated from position information of the extracted vehicles, position information of own vehicle and the running directions of the respective vehicles. Further, in subsequent risk estimation (calculation) processing, relative acceleration, relative distance and time before collision may be calculated in place of the relative speed.

Next, the risk judging unit 32 extracts a maximum relative speed among the relative speeds calculated in Step S303 (Step S304).

Next, the risk judging unit 32 calculates an average value of the relative speed extracted from own vehicle in Step S304 and the relative speed (used for risk judgment by the surrounding vehicles) of the vehicle that exposes its surrounding vehicles to risk (Step S305).

The risk judging unit 32 calculates (estimates) a degree of risk from the relative speed extracted from own vehicle in Step S304, the relative speed used for risk judgment by the surrounding vehicle which has been obtained in Step S301, and the average relative speed calculated in Step S305 (Step S306). For example, it is assumed that in a case where the total number of own vehicle and surrounding vehicles is N, the relative speed of own vehicle is the 1-th largest. In this case, the degree of risk R is calculated from Equation (6) below.

$$R=\alpha\times(1-N/2)/N \tag{6}$$

As described above, the degree of risk may be calculated based on what number a value of relative speed of own vehicle corresponds to in the whole. In contrast, the degree of risk may be calculated using a function defined from, for example, the value of relative speed of own vehicle, an average of the respective relative speeds and variance.

Next, the risk judging unit 32 individually calculates a distance (first distance) D required for decelerating/stopping to a target speed v' (v'=0 m/s) for own vehicle and the surrounding vehicles (Step S307). For example, the first distance D (m) on this occasion is calculated using a running speed v (m/s), the target speed v' (m/s), deceleration a (m/s$^2$), and the total time τ (sec) of a judgment time of a driver, a communication delay and the like, which is expressed by Equation (7) below.

$$D=(v^2-v'^2)+(2\times a)+(v-v')\times\tau \tag{7}$$

Next, the risk judging unit 32 calculates a distance (safe distance) required for decelerating own vehicle and the surrounding vehicle to a certain speed, from the first distance calculated in Step S307 and a positional relationship between the extracted target vehicle and own vehicle (Step S308).

For example, it is assumed that a vehicle i and a vehicle j are running in the same direction and the first distances required for deceleration to a certain speed are Di and Dj, respectively, and then a second distance Dij (m) is expressed by Equation (8) below.

$$Dij=|Di-Dj| \tag{8}$$

The risk judging unit 32 calculates the second distance Dij for all of the target vehicles extracted in Step S302, and calculates (sets) a maximum distance (regarded as the safe distance) Ds (m) (Equation (9) below).

$$Ds=\max\{Dij\}(j=1, \ldots, N) \tag{9}$$

Note that N represents the number of vehicles capable of communicating with own vehicle i. As can be seen from the calculation method for the safe distance Ds, the safe distance Ds is calculated (estimated) using elements (such as speed information and position information) included in the own vehicle information and elements (such as speed information and position information) included in the surrounding vehicle information.

Next, the risk judging unit 32 transmits the degree of risk selected in Step S306 and the safe distance Ds calculated in Step S308 to the congestion control processing unit 20 (Step S309).

The estimation processing for a degree of risk and the like is completed until Step S309, and thereafter the procedures from S301 to S309 are executed repeatedly. On this occasion, the procedures may be executed in a cycle or may be executed only in a case where a request for obtaining a degree of risk is made from the congestion control processing unit 20.

Figure 11:
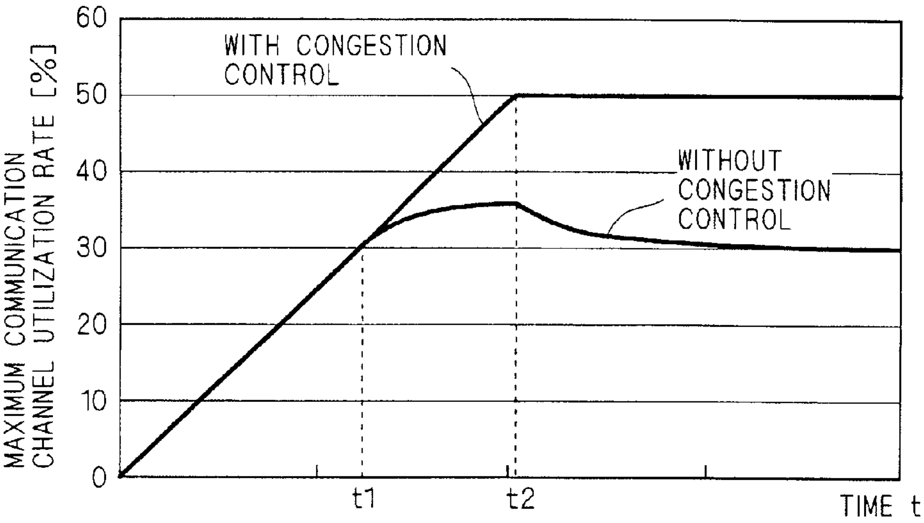
FIG. 11 is a figure for describing a method of controlling congestion.
Figure 12:
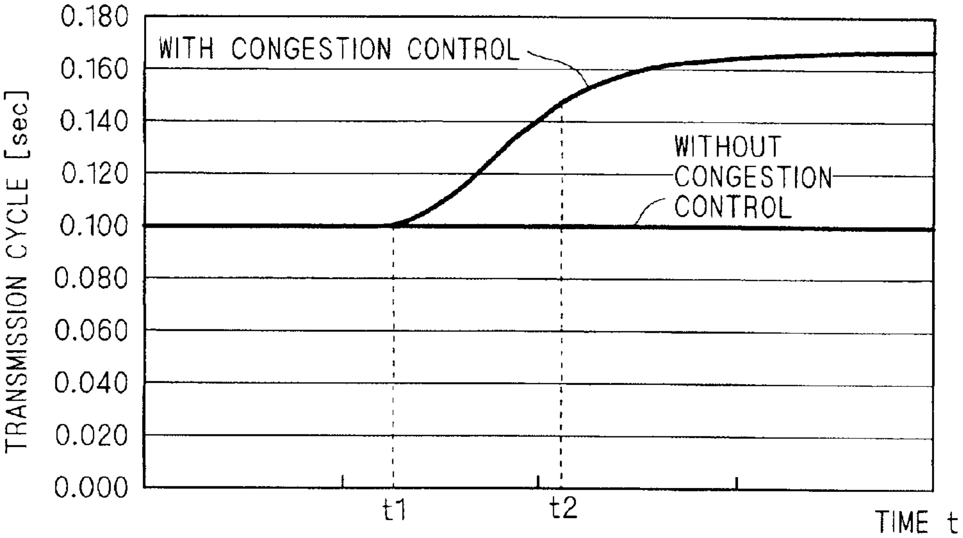
FIG. 12 is a figure for describing an example of setting a transmission cycle.

FIG. 11 shows a setting example of transmission power. FIG. 12 shows a setting example of a transmission cycle. In FIG. 11, a horizontal axis and a vertical axis represent time and a maximum communication channel utilization rate, respectively. On the other hand, in FIG. 12, a horizontal axis and a vertical axis represent time and a transmission cycle, respectively.

As shown in FIG. 11, in a case where congestion control processing is not performed, there is assumed a communication environment in which the communication channel utilization rate rises from 0% to 50% between a time 0 to a time t2 and a state of 50% is maintained after the time t2. The communication channel utilization rate at the time t1 is 30%. In FIG. 12, in a case where congestion control processing is not performed, the transmission cycle remains an initial value of 100 msec.

The congestion control processing is performed in a case where a target communication channel utilization rate Oth is 30%. Then, as shown in FIG. 12, in a case where the communication channel utilization rate O(t) is smaller than the target communication channel utilization rate Oth (between times 0 to t1), a minimum transmission cycle or less is exhibited even when the congestion control processing is performed. For this reason, the transmission cycle is 100 msec, which is the same as the initial value. However, FIG. 12 reveals that in a case where the communication channel utilization rate O(t) exceeds the target communication channel utilization rate Oth (at time t1 and thereafter), the transmission cycle becomes longer by the congestion control processing.

As shown in FIG. 11, this congestion control processing suppresses an increase in communication channel utilization rate even when the maximum communication channel utilization rate increases (from times t1 to t2). Then, once the maximum communication channel utilization rate maintains 50% (at time t2 and thereafter), the congestion control processing is performed such that the communication channel utilization rate converges on the target communication channel utilization rate Oth. Note that in this example, K of 0.02, 1 of 0.5 and Td of 0.0 are used.

Figure 13:
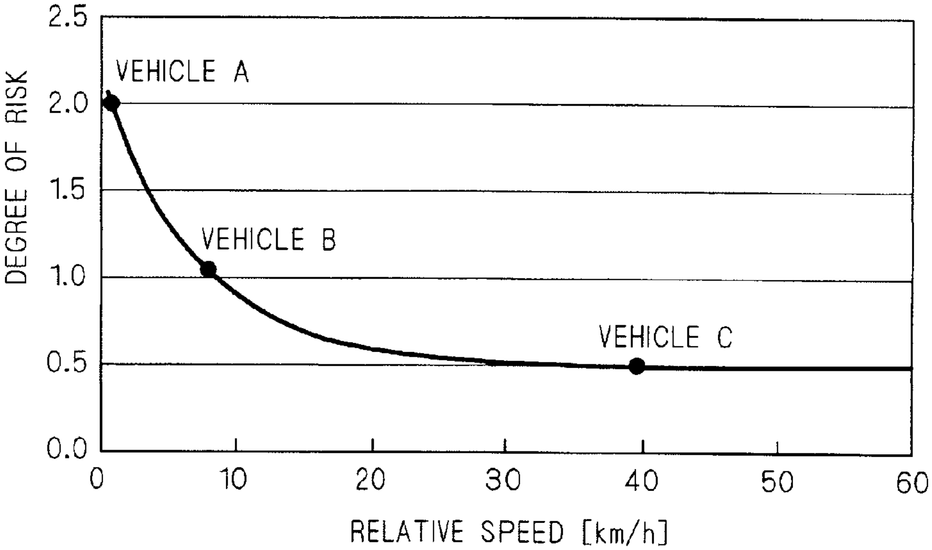
FIG. 13 is a figure for describing an example of degree of risk judging processing.

FIG. 13 shows an example of degree of risk judging processing. In FIG. 13, a degree of risk is defined in accordance with a magnitude of relative speed, which shows a function of degree or risk represented by Equation (10) below.

$$R=\exp\{-a(V-V')\}+b \tag{10}$$

Note that FIG. 13 is a graph in a case where a of 0.5, b of 0.5 and V' of 3.6 (km/h) are used in Equation (10).

In FIG. 13, when there are a vehicle A whose relative speed is 0.36 (km/h), a vehicle B whose relative speed is 8.0 (km/h) and a vehicle C whose relative speed is 40.0 (km/h), degrees of risk R thereof are calculated as 2.0, 1.0 and 0.5, respectively.

Figure 14:
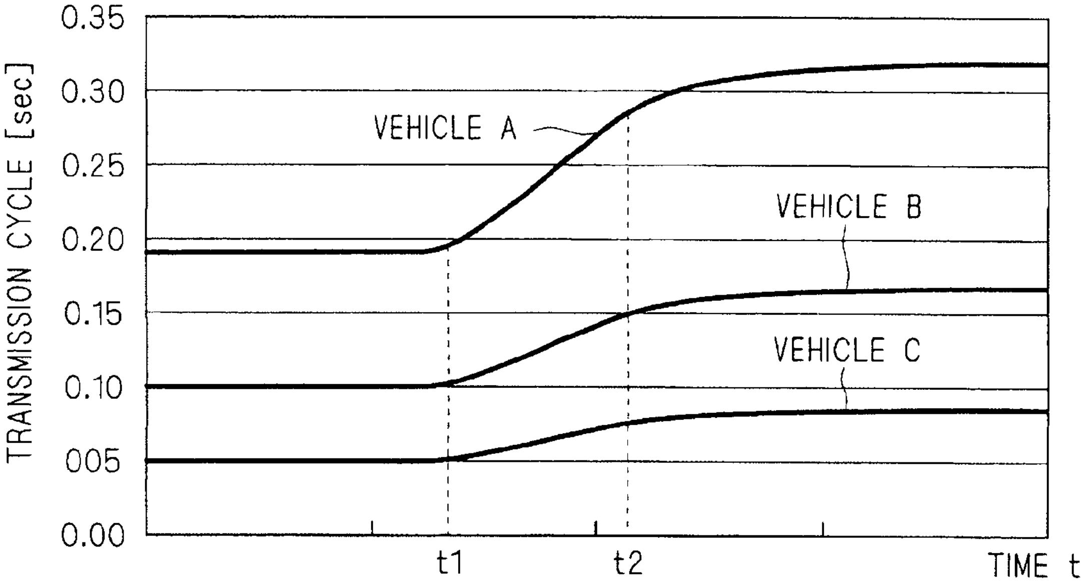
FIG. 14 is a figure for describing an example of performing weighting in accordance with a degree of risk to set a transmission cycle.

When the communication channel utilization rate shown in FIG. 11 fluctuates, transmission cycles corresponding to degrees of risk shown in FIG. 13 are calculated. Then, transmission cycles as shown in FIG. 14 are respectively set, and the transmission cycles of the vehicles A, B and C respectively fluctuate as well. Note that it is assumed here that the respective degrees of risk do not change irrespective of time.

As described above, in order to avoid congestion in a case where communication channels become crowded, the on-vehicle communication device 100 according to the present embodiment appropriately controls a transmission cycle of transmission data transmitted from own vehicle, by feedback control using own vehicle information and surrounding vehicle information. Then, a channel utilization rate of own vehicle is suppressed to be equal to or lower than a certain level. As a result, the on-vehicle communication device 100 is capable of avoiding congestion, and accordingly is capable of securing reliability of communication.

Further, the on-vehicle communication device 100 according to the present embodiment performs weighting in accordance with the degree of risk R in calculating the transmission cycle. Accordingly, it is possible to suppress a delay in communication of a vehicle with high risk.

Further, the on-vehicle communication device 100 according to the present embodiment controls (calculates) the transmission power for securing a communication distance required by an application, using the safe distance. Accordingly, for example, a collision between vehicles is prevented, which maintains safety of vehicles. Moreover, the on-vehicle communication device 100 according to the present embodiment is controlled to have the (minimum required) transmission power so as to communicate with a dangerous vehicle, whereby the transmission power is not excessively transmitted, which suppresses the generation of congestion.

Further, in the on-vehicle communication device 100 according to the present invention, the communication control means 3 estimates a degree of risk of own vehicle from own vehicle information and surrounding vehicle information. In addition, the communication control means 3 controls a transmission cycle of own vehicle based on a communication channel utilization rate of own vehicle, a communication channel utilization rate of a surrounding vehicle and the degree of risk. Moreover, the communication control means 3 estimates the safe distance using the own vehicle information and surrounding vehicle information. Then, the communication control means 3 controls the transmission power of own vehicle based on the communication channel utilization rate of own vehicle, the communication channel utilization rate of a surrounding vehicle and the safe distance.

As described above, the on-vehicle communication device 100 controls a transmission cycle and transmission power not only using information detected by own vehicle but also using, for example, information obtained from the surrounding vehicle. Accordingly, it is possible to perform communication control in consideration of a congestion situation in an area which is not detected by own vehicle.

Further, as described above, the communication control means 3 controls the transmission cycle and the transmission power also based on a degree of risk which is obtained from and calculated by a surrounding vehicle. Accordingly, it is possible to control communication of own vehicle so as to communicate with a dangerous surrounding vehicle in a preferential manner as much as possible.

Further, the on-vehicle communication device 100 according to the present embodiment includes the data generating means 4 that generates transmission data including own vehicle information, a communication channel utilization rate of own vehicle and a degree of risk which is calculated by own vehicle, at a predetermined timing. The transmitting/receiving means 2 transmits the generated transmission data under control of the communication control means 3.

Therefore, for example, in a case where a surrounding vehicle includes the on-vehicle communication device 100, a transmission cycle and transmission power of the transmission data can be appropriately controlled in the surrounding vehicle as in the above.

Further, in the on-vehicle communication device 100 according to the present embodiment, the communication control means 3 controls transmission power also in consideration of the reception sensitivity in wireless communication of a surrounding vehicle and a degree of risk of the surrounding vehicle which are received by the transmitting/receiving means 2.

Therefore, it is possible to control transmission power of own vehicle to, for example, minimum required transmission power for enabling communication with a surrounding vehicle having a higher degree of risk. As a result, it is possible to limit a communication area, which avoids communication with an unnecessary area causing congestion.

Further, the on-vehicle communication device 100 according to the present embodiment receives position information of a surrounding vehicle form the surrounding vehicle, and the communication control means 3 calculates a relative distance between the surrounding vehicle and own vehicle from position information of own vehicle and position information of the surrounding vehicle. In addition, the communication control means 3 controls transmission power of own vehicle also based on the relative distance.

Therefore, it is possible to control transmission power of own vehicle to minimum required transmission power for enabling communication with a surrounding vehicle which requires communication. As a result, it is possible to narrow down a communication area to the minimum required, which avoids communication with an unnecessary area causing congestion.

Further, in place of controlling transmission power, a reception sensitivity and a carrier sense sensitivity are controlled. As a result, it is possible to extend or narrow an area capable of being received or to extend or narrow an area in which a communication channel is capable of being judged to be in use (busy). Accordingly, a collision of information which leads to congestion can be avoided.

Further, in the on-vehicle communication device 100 according to the present embodiment, the communication control means 3 is capable of controlling transmission power of own vehicle also based on a relative distance obtained from position information of own vehicle and position information of a surrounding vehicle and map information set in advance.

For example, when a vehicle is approaching an intersection, it is required to transmit information to oncoming vehicles. In such a case, if the vehicle is capable of communicating with a lead vehicle of a group of oncoming vehicles, it is effective for avoiding a risk. Accordingly, with the configuration descried above, for example, it is not required to set unnecessary transmission power for communication with surrounding vehicles of the group of vehicles, other than the lead vehicle.

Further, in the on-vehicle communication device 100 according to the present embodiment, the communication control means 3 is capable of controlling transmission power of own vehicle based on acceleration information of own vehicle and map information set in advance which can be obtained from own vehicle.

For example, an intersection has a strong possibility of risk or congestion, and thus it is effective to control the transmission power as closer to the intersection. Therefore, with the configuration described above, it is possible to, for example, reduce transmission power of communication with a surrounding vehicle which is about to stop in the vicinity of an intersection obtained from map information. On the other hand, it is possible to increase only transmission power of communication with a surrounding vehicle (whose acceleration is high in the vicinity of the intersection) which enters the intersection. This enables effective congestion control at an intersection.

Note that the on-vehicle communication device 100 refers to a communication terminal mounted on vehicles, and includes communication terminals capable of being carried in vehicles, such as wireless LAN terminals and cellular phones. Alternatively, the on-vehicle communication device 100 may include a fixed communication device such as base station.

While the invention has been shown and described in detail, the foregoing description is in all aspects illustrative and not restrictive. It is therefore understood that numerous modifications and variations can be devised without departing from the scope of the invention.

The invention claimed is:

1. An on-vehicle communication device mounted on a first vehicle and wirelessly communicating with at least one second vehicle other than said first vehicle, comprising:

a transmitter/receiver configured to obtain a first communication channel utilization rate indicating a time rate at which a radio wave field intensity of a predetermined level or more in said first vehicle is received and to receive from said second vehicle, second vehicle information regarding running of said second vehicle and a second communication channel utilization rate indicating a time rate at which a radio wave field intensity of a predetermined level or more in said second vehicle is received; and communication control means controlling a first vehicle transmission cycle and first vehicle transmission power when data is transmitted from said transmitter/receiver, wherein said communication control means controls said first vehicle transmission cycle based on said first communication channel utilization rate and said second communication channel utilization rate to increase the first transmission cycle if said first channel communication rate is equal to or higher than a certain level and to decrease said first transmission cycle if said first channel communication rate is equal to or lower than a second level and within a certain range, so as to converge on a target communication channel utilization rate.

2. The on-vehicle communication device according to claim 1, wherein:

said communication control means controls said first vehicle transmission cycle based on a maximum communication channel utilization rate of said first communication channel utilization rate and said second communication channel utilization rate.

3. The on-vehicle communication device according to claim 2, wherein said communication control means controls said communication channel utilization rate to a predetermined communication channel utilization rate by feedback control of said first vehicle transmission power, based on said communication channel utilization rate.

4. The on-vehicle communication device according to claim 1, wherein:

said communication control means:

estimates a first degree of risk indicating a degree of risk of said first vehicle using first vehicle information and said second vehicle information, the first vehicle information being obtained from said first vehicle and relating to running of said first vehicle; and controls said first vehicle transmission cycle by weighting based on said first degree of risk.

5. The on-vehicle communication device according to claim 1, wherein said communication control means:

estimates a safe distance required for performing deceleration to a predetermined speed or stop using said first vehicle information and said second vehicle information; and controls said first vehicle transmission power based on said safe distance.

6. The on-vehicle communication device according to claim 4, wherein:

said transmitter/receiver further receives a second degree of risk indicating a degree of risk of said second vehicle from said second vehicle; and said communication control means controls said first vehicle transmission cycle further based on said second degree of risk.

7. The on-vehicle communication device according to claim 4, further comprising data generating means generating, at a predetermined timing, transmission data including at least said first vehicle information, said first communication channel utilization rate and said first degree of risk, wherein said transmitter/receiver transmits said transmission data generated by said data generating means under control of said communication control means.

8. The on-vehicle communication device according to claim 1, wherein:

said first vehicle information includes position information of said first vehicle;

said second vehicle information includes position information of said second vehicle; and said communication control means:

calculates a relative distance between said first vehicle and said second vehicle from said position information of said first vehicle and said position information of said second vehicle; and controls said first vehicle transmission power further based on said relative distance.

9. The on-vehicle communication device according to claim 8, wherein said communication control means controls said first vehicle transmission power further based on map information set in advance.

10. The on-vehicle communication device according to claim 1, wherein:

said first vehicle information includes acceleration information of said first vehicle; and said communication control means controls said first vehicle transmission power further based on the acceleration information of said first vehicle and map information set in advance.

* * * * *